United States Patent
Picard (10) Patent No.: US 11,855,790 B2
(45) Date of Patent: *Dec. 26, 2023

(54) POWER-OVER-ETHERNET (POE) CONTROL SYSTEM

(71) Applicant: TEXAS INSTRUMENTS INCORPORATED, Dallas, TX (US)

(72) Inventor: Jean Picard, Hooksett, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 261 days.

This patent is subject to a terminal disclaimer.

(21) Appl. No.: 17/227,166

(22) Filed: Apr. 9, 2021

(65) Prior Publication Data
US 2021/0234711 A1 Jul. 29, 2021

Related U.S. Application Data

(63) Continuation of application No. 15/865,441, filed on Jan. 9, 2018, now Pat. No. 11,012,247, which is a
(Continued)

(51) Int. Cl.
*H04L 12/10* (2006.01)
*H05B 47/19* (2020.01)

(52) U.S. Cl.
CPC ............ *H04L 12/10* (2013.01); *H05B 47/19* (2020.01)

(58) Field of Classification Search
CPC .......... H04L 12/10; H05B 47/19; H05B 47/00
See application file for complete search history.

(56) References Cited

U.S. PATENT DOCUMENTS

| 6,094,646 A | 7/2000 | Runkler et al. |
| 6,269,376 B1 | 7/2001 | Dhillon et al. |

(Continued)

FOREIGN PATENT DOCUMENTS

| CN | 102113270 A | 6/2011 |
| CN | 102214954 A | 10/2011 |

(Continued)

OTHER PUBLICATIONS

China National Intellectual Property Administration ("CNIPA") Notification of Allowance with attached Search Report; PRC (China) Patent Application No. 201910280039.6; dated Jan. 4, 2023.
(Continued)

*Primary Examiner* — Jaweed A Abbaszadeh
*Assistant Examiner* — Brian J Corcoran
(74) *Attorney, Agent, or Firm* — Ray A. King; Frank D. Cimino (57) ABSTRACT

A method that may be used for power-over-Ethernet includes generating and sending a first pulse of a voltage signal during a classification phase, receiving a current that is responsive to the first pulse, and determining a nominal power of a powered device (PD) from the current. The method also includes generating and sending a quantity of pulses of the voltage signal subsequent to the first pulse during the classification phase, the quantity of pulses including a command to operate the PD at less than the nominal power level during an operational phase subsequent to the classification phase.

12 Claims, 5 Drawing Sheets

Related U.S. Application Data continuation of application No. 14/448,753, filed on Jul. 31, 2014, now abandoned.

(60) Provisional application No. 61/864,179, filed on Aug. 9, 2013.

(56) References Cited

U.S. PATENT DOCUMENTS

| | | | |
|---|---|---|---|
| 7,003,136 B1 | 2/2006 | Harville | |
| 7,139,739 B2 | 11/2006 | Agrafiotis et al. | |
| 2005/0132240 A1 | 6/2005 | Stineman | |
| 2006/0092000 A1* | 5/2006 | Karam | H04L 12/44 713/300 |
| 2006/0212724 A1* | 9/2006 | Dwelley | H04L 12/10 713/300 |
| 2007/0041387 A1 | 2/2007 | Ghoshal et al. | |
| 2007/0103829 A1* | 5/2007 | Darshan | H04L 12/10 361/90 |
| 2007/0237322 A1 | 10/2007 | Hussain et al. | |
| 2007/0257780 A1 | 11/2007 | Schindler | |
| 2007/0296394 A1* | 12/2007 | Landry | H04L 12/10 323/371 |
| 2008/0164884 A1* | 7/2008 | Hussain | H04L 12/10 324/522 |
| 2008/0278487 A1 | 11/2008 | Gobert | |
| 2009/0001956 A1* | 1/2009 | Velez | H04L 12/10 323/304 |
| 2010/0031066 A1 | 2/2010 | Geiger et al. | |
| 2010/0088492 A1 | 4/2010 | Chakradhar et al. | |
| 2010/0185695 A1 | 7/2010 | Bekkerman et al. | |
| 2010/0278384 A1 | 11/2010 | Shotton et al. | |
| 2010/0296705 A1 | 11/2010 | Miksa et al. | |
| 2011/0131549 A1 | 6/2011 | Bozak et al. | |
| 2011/0133551 A1 | 6/2011 | Moller et al. | |
| 2011/0248572 A1 | 10/2011 | Kozakai et al. | |
| 2011/0268316 A1 | 11/2011 | Bronder et al. | |
| 2012/0235879 A1 | 9/2012 | Eder et al. | |
| 2012/0330447 A1 | 12/2012 | Gerlach et al. | |
| 2013/0057056 A1 | 3/2013 | Karam et al. | |
| 2013/0159754 A1 | 6/2013 | Wendt | |
| 2015/0042243 A1 | 2/2015 | Picard | |

FOREIGN PATENT DOCUMENTS

| | | |
|---|---|---|
| CN | 102497274 | 6/2012 |
| JP | 2009089258 A | 4/2009 |
| WO | WO2006099440 | 8/2008 |

OTHER PUBLICATIONS

Communication from Lee and Li, dated Jan. 13, 2023 (4 pages).
Supplemental Partial Search Report for European Application No. 14834395.7, dated Feb. 8, 2017 (3 pages).
PCT Search Report for PCT/US14/050568, dated Oct. 30, 2014 (2 pages).
Communication from Lee and Li, dated Jun. 10, 2018 (9 pages).

* cited by examiner

POWER-OVER-ETHERNET (POE) CONTROL SYSTEM

CROSS-REFERENCE TO RELATED APPLICATION

This application is a continuation of U.S. Nonprovisional application Ser. No. 15/865,441 filed Jan. 9, 2018, which is a continuation of U.S. Nonprovisional application Ser. No. 14/448,753, filed Jul. 31, 2014, now abandoned, which claims the benefit of U.S. Provisional Patent Application No. 61/864,179, filed Aug. 9, 2013, and entitled PoE LIGHTING CLASSIFICATION AND CONTROL METHOD, FOUR PAIRS HIGH POWER, which are incorporated herein by reference in their entirety.

TECHNICAL FIELD

This disclosure relates generally to electronic systems, and more specifically to a power-over-Ethernet (PoE) control system.

BACKGROUND

A variety of control systems can be implemented to provide power and control to power consuming equipment, such as lighting devices or other types of devices that consume power. One such control system is Power-over-Ethernet (PoE), such as defined by the IEEE 802.3at standard, is a manner of safely providing power to a powered device (PD) over a cable via power sourcing equipment (PSE), and of removing power if a PD is disconnected. As an example, the process proceeds through an idle state and three operational states of detection, classification, and operation. During detection, the PSE can leave the cable unpowered in the idle state while it periodically looks to see if a PD has been plugged-in. The low-power levels that can be used during detection are unlikely to damage devices not designed for PoE. If a valid PD signature is present, during classification, the PSE may inquire as to how much power the PD requires. The PSE may then provide the required power to the PD if it has sufficient power providing capacity.

SUMMARY

One example includes a power-over-Ethernet (PoE) control system. The system includes a powered device (PD) that is configured to receive a voltage signal via an Ethernet connection and which comprises a PoE signal receiver configured to indicate a nominal power level via the received voltage signal. The system also includes a power sourcing equipment (PSE) device configured to generate the voltage signal and to measure a class current of the voltage signal to determine the nominal power level. The PSE device includes a PoE controller configured to provide a power setting command as a function of the nominal power level to the PoE signal receiver via the voltage signal, such that the PD can operate at a power level that is based on the power setting command.

Another example includes a method for providing power control in a PoE control system. The method includes providing event classifications of a voltage signal via an Ethernet connection from a PSE device. The method also includes indicating a nominal power level based on a class signature via a PoE signal receiver of a powered device (PD) based on a class current of the voltage signal. The method also includes providing a power setting command associated with a quantity of class events of the voltage signal from the PSE device to the PoE signal receiver. The power setting command can correspond to a percentage of the nominal power level. The method further includes activating the PD to operate at the percentage of the nominal power level based on the power setting command.

Another example includes a PoE control system. The system includes a powered device (PD) that is configured to receive a voltage signal via an Ethernet connection and which comprises a PoE signal receiver configured to provide a first class signature in response to a first event classification via a class current of the received voltage signal and a second class signature via the class current, the second class signature having a different class value from the first class signature, and a third class signature that has a class value that is less than the second class signature to indicate that the PD has a capacity for PoE control. The third class signature can indicate a nominal power level of the PD. The system further includes a PSE device configured to generate the voltage signal and to measure the class current of the voltage signal to determine the capacity for PoE control and the nominal power level. The PSE device includes a PoE controller configured to provide a power setting command as a function of the nominal power level to the PoE signal receiver via the voltage signal, such that the PD can operate at a power level that is based on the power setting command.

DETAILED DESCRIPTION

This disclosure relates generally to electronic systems, and more specifically to a power-over-Ethernet (PoE) control system. A PoE control system can include a power sourcing equipment (PSE) device and a powered device (PD) that are electrically coupled via an Ethernet connection, such as an RJ-45 cable. As an example, the PD can correspond to a lighting system or any of a variety of other electronic devices that consume a varying amount of power. The PSE device includes a PoE controller and is configured to provide a voltage signal that can vary in amplitude depending on the phase of PoE control. The PD can include a PoE signal receiver that is configured as a current source in response to the voltage signal provided by the PSE device. The PoE controller can monitor the class current of the voltage signal to determine class signatures. In this manner, the PD can include a PoE signal receiver to indicate to the PSE device that the PD has a capacity for PoE control, and can indicate a nominal power level of the PD to the PSE device via the class current of the voltage signal. Therefore, the PSE device can provide pulses via the voltage signal as a power setting command to the PD, such that the PD can operate at a power level that is based on the power setting command.

For example, subsequent to a detection phase during which the PSE device determines if the PD is connected, the PSE device can operate in a classification phase. During the classification phase, the PSE device can provide the voltage signal at a classification amplitude to provide event classifications that include one or more class events and corresponding mark events (e.g., in a 1-Event or 2-Event classification scheme) via the voltage signal to the PD, such that the PD can control the class current of the voltage signal to provide respective class signatures to the PSE device. As an example, the PD can provide a first class signature and a second class signature, with the first and second class signatures being different. Subsequent to the second class signature, the PD can provide a third class signature to the PSE device that is less than the second class signature to indicate the capacity for PoE control by the PSE device. As another example, the third class signature can indicate a nominal power level of the PD to the PSE device. For example, the third class signature can have a value corresponding to one of a plurality of predetermined nominal power levels, such that the PSE device can identify the nominal power level based on the value of the third class signature.

Subsequent to the indication of the nominal power level, the PSE device can provide a number of class events that can correspond to a code corresponding to the power setting command, with the quantity of pulses corresponding a predetermined percentage of the nominal power level. As a result, the PSE device can provide the voltage signal in the activation phase at a maximum amplitude, such that the PD can operate at the percentage of the nominal power level based on the power command setting. Accordingly, the PoE control system described herein can operate to provide physical (PHY) layer power control of the PD in a simplistic and variable manner.

Figure 1:
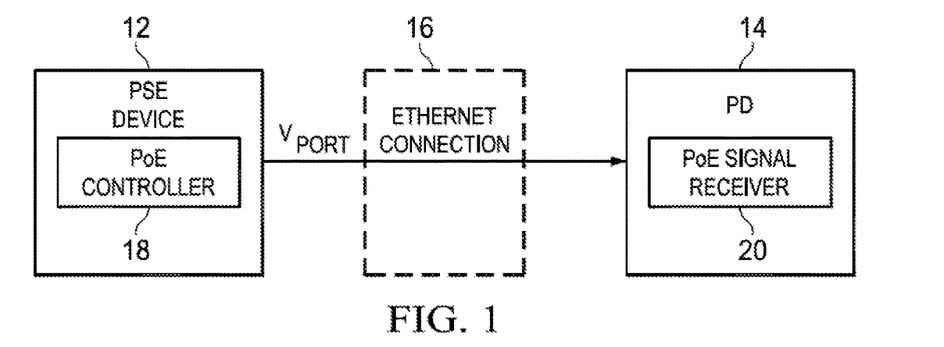
FIG. 1 illustrates an example of a power-over-Ethernet (PoE) control system.

FIG. 1 illustrates an example of a power-over-Ethernet (PoE) control system 10. The PoE control system 10 can be implemented in a variety of power-providing applications, such as illumination. For example, the PoE control system 10 can be implemented to provide power control via existing Ethernet cables (e.g., RJ-45 cables) without Ethernet data communication capability (e.g., utilizing data/link layers, packetization, etc.). Accordingly, as described herein, the PoE control system 10 provides PoE power control in a physical (PHY) layer manner.

The PoE control system 10 includes a power sourcing equipment (PSE) device 12 and a powered device (PD) 14 that are electrically coupled via an Ethernet connection 16. As an example, the Ethernet connection 16 can be an RJ-45 cable that implements twisted pair conductors (e.g., four twisted pairs). The PSE device 12 is configured to provide a voltage signal $V_{PORT}$ to the powered device via the Ethernet connection 16 to implement bilateral communication between the PSE device 12 and the PD 14. For example, the voltage $V_{PORT}$ can correspond to a fixed voltage $V_{POE}$ that is generated in the PSE device 12 and which is modulated in amplitude. As an example, the PD 14 can be configured as a Type 2 PD according to the IEEE 802.3 standard.

As described herein, the voltage signal $V_{PORT}$ can correspond to a voltage signal that varies to provide event classifications from the PSE device 12 to the PD 14 in an event classification scheme, such that the PD 14 can respond to the class events by varying the current of the voltage signal $V_{PORT}$ to provide a class signature to the PSE device 12, such as based on the IEEE 802.3 standard. As also described herein, the term "event classification" describes the PSE device 12 providing one or more class events and corresponding mark events to the PD 14 to provide communication to and/or to elicit a communication response from the PD 14 in the form of a class signature. As also described herein, the term "class event" describes a pulse of the voltage signal $V_{PORT}$ at a predetermined amplitude, and which is followed by a mark event (e.g., decreased voltage subsequent to the pulse) that signifies an end of the class event. As further described herein, the term "class signature" refers to a response by the PD 14 of an event classification that includes the one or more class events in the form of a magnitude of class current that corresponds to a class level, described herein as Class 0 through Class 5, with the class values corresponding to increasing amplitudes of the class current in ascending order of class value.

In the example of FIG. 1, the PSE device 12 includes a PoE controller 18, and the PD 14 includes a PoE signal receiver 20. The PoE controller 18 can be configured to control an activation time and an amplitude of the voltage signal $V_{PORT}$, such as based on a given operating phase of the PoE control system 10, to provide communication to the PD 14. The PoE controller 18 can also be configured to measure the class current associated with the voltage signal $V_{PORT}$, and thus to determine the class level of a class signature. The PoE signal receiver 20 can be configured to receive the voltage signal $V_{PORT}$ and to act as a class current source with respect to the voltage signal $V_{PORT}$, such that the PoE signal receiver 20 can adjust the class current of the voltage signal $V_{PORT}$ to provide communication to the PSE device 12 in response to the voltage signal $V_{PORT}$. As an example, the PoE controller 18 can implement the communication with the PoE signal receiver 20 via a standard, such as IEEE 802.3. For example, the PoE controller 18 can be configured to provide event classifications as a 1-Event Physical Layer classification to provide a single class event, or as a 2-Event Physical Layer classification to provide a series (e.g., two) of class events followed by respective mark events. In response, the PD 14 can provide a corresponding class signature. As described herein, the term As an example, the PSE device 12 can initially operate in a detection phase, such that the PSE device 12 can provide the voltage signal $V_{PORT}$ at a valid test voltage amplitude (e.g., between approximately 2.8 volts and approximately 10 volts) at periodic intervals. If the PD 14 is electrically coupled to the PSE device 12 via the Ethernet connection 16, the PoE signal receiver 20 can respond by providing a sufficient resistance with respect to the voltage signal $V_{PORT}$ to indicate to the PSE device 12 that the PD 14 is coupled via the Ethernet connection 16. Subsequent to the detection phase, the PSE device 12 switches to a classification phase.

During the classification phase, the PSE device 12 can provide the voltage signal $V_{PORT}$ at a classification amplitude (e.g., between approximately 15.5 volts and approximately 20.5 volts) to provide class events (e.g., 1-Event classifications and/or 2-Event classifications) via the voltage signal $V_{PORT}$ to the PD 14, as controlled by the PoE controller 18. In response to the class events, the PoE signal receiver 20 can control the class current of the voltage signal $V_{PORT}$ to provide respective class signature to the PSE device 12, such that each class signature has a range of class current amplitudes that corresponds to a predetermined Class (e.g., as dictated by IEEE 802.3at). As described previously, the PoE controller 18 can measure the class current of the voltage signal $V_{PORT}$ in each class event, such that the PoE controller 18 can determine the class signature provided by the PoE signal receiver 20. Accordingly, as described herein, the PSE device 12 and the PD 14 can communicate with each other.

As an example, in the classification phase, the PoE signal receiver 20 can provide a first class signature in response to a first event classification, followed by a second class signature in response to a second event classification, and a third class signature in response to a third event classification. The PoE signal receiver 20 can provide the second class signature at a different class (e.g., at a greater current) than the first class signature, and can provide the third class signature at a class less than the second class signature to indicate the capacity for PoE control of the PD 14 by the PSE device 12. For example, the first class signature can be provided at Class 4 (e.g., in response to each of two class events of the first event classification), the second class signature can be provided at Class 5, and the third class signature can be provided at a range of classes less than Class 5 (e.g., Class 0-4). As described herein, the term "Class 5" with respect to a class signature is defined as a class signature having a higher class current than a Class 4 class signature, such as implemented in the IEEE 802.3 standard. Therefore, in response to the values in the sequence of the classes provided by the PoE signal receiver 20, the PoE controller 18 can identify that the PD 14 has a capacity for PoE control by the PSE device 12.

In response to a determination of the capacity for PoE control of the PD 14 by the PSE device 12, the PD 14 can provide an indication of a nominal power level of the PD 14 to the PSE device 12. As described herein, the nominal power level of the PD 14 corresponds to a maximum power consumption of the PD 14 at full and normal operating conditions (e.g., full light level for a PoE lighting system). For example, the third class signature that is less than the second class signature can have a class value (e.g., one of Class 0-4) corresponding to one of a plurality of predetermined nominal power levels, such that the PoE controller 18 can identify the nominal power level based on the value of the third class signature. In response to identifying the nominal power level of the PD 14, the PoE controller 18 can be configured to control the power level of the PD 14 as a function of the nominal power level, such that the power output of the PD 14 can be variably controlled by the PoE controller 18.

For example, subsequent to the indication of the nominal power level, the PoE controller 18 can provide a number of class events via the voltage signal $V_{PORT}$ associated with a code corresponding to the power setting command. As an example, the power setting command can be encoded based on a quantity of pulses of the class events corresponding to a predetermined percentage of the nominal power level. In response to the code, the PoE signal receiver 20 can identify the portion (e.g., percentage) of the nominal power level that is desired to be output from the PD 14 by the PoE controller 18. As a result, the PSE device 12 can provide the voltage signal $V_{PORT}$ in the activation phase at a maximum power on amplitude (e.g., between approximately 44 volts and approximately 57 volts, as dictated by a maximum voltage of an associated power supply). Therefore, the PD 14 can operate at the percentage of the nominal power level based on the power command setting. Accordingly, the PoE control system 10 described herein can operate to provide PHY layer power control of the PD 14 in a simplistic and variable manner.

Figure 2:
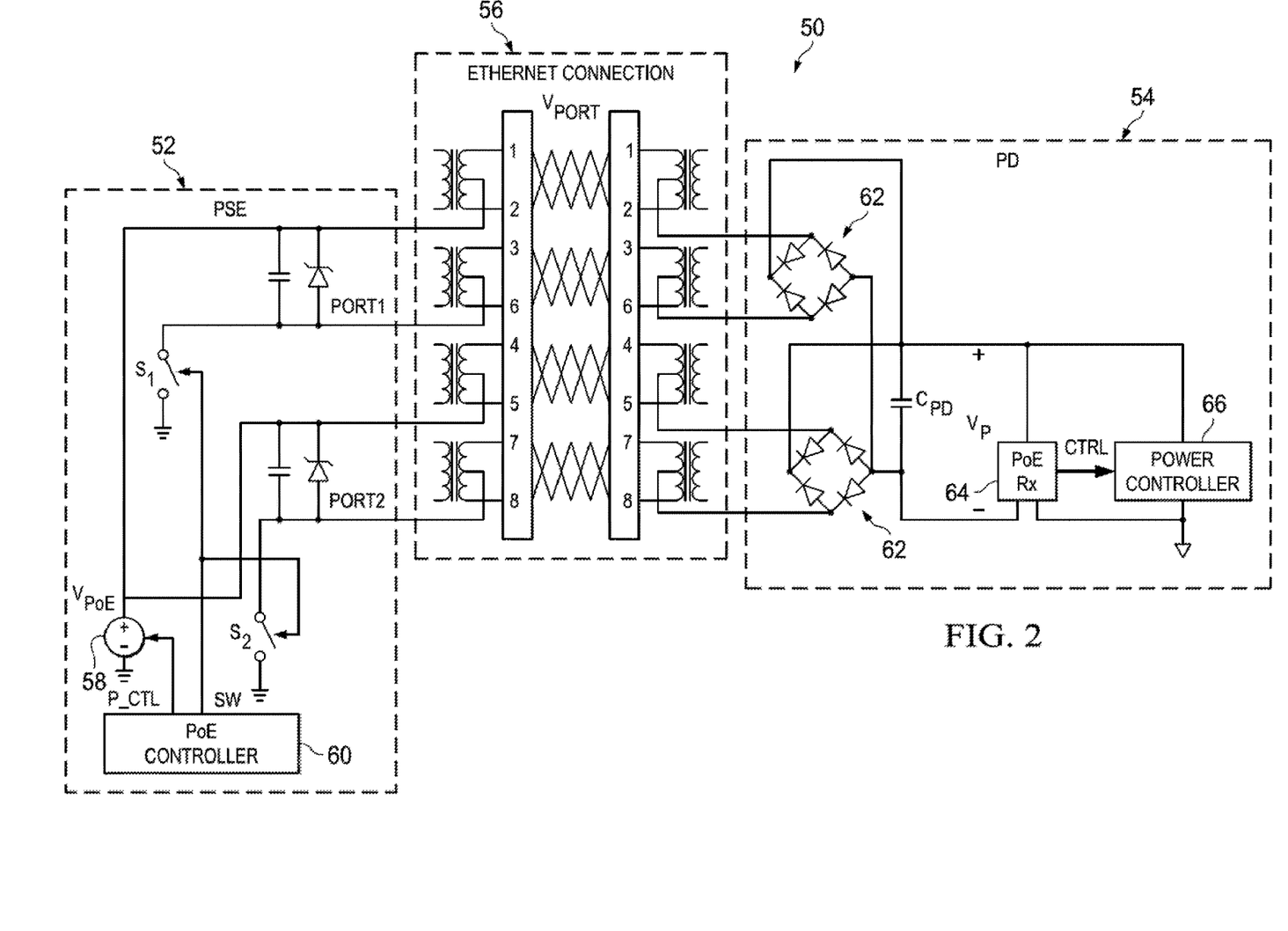
FIG. 2 illustrates another example of a PoE control system.

FIG. 2 illustrates another example of a PoE control system 50. The PoE control system 50 can correspond to the PoE control system 10 in the example of FIG. 1, such as in a PoE lighting application. For example, the PoE control system 50 can be implemented to provide power control via existing Ethernet cables (e.g., RJ-45 cables) without Ethernet data communication capability (e.g., utilizing data/link layers, packetization, etc.).

The PoE control system 50 includes a PSE device 52 and a PD 54 that are electrically coupled via an Ethernet connection 56. In the example of FIG. 2, the Ethernet connection 56 is demonstrated as an RJ-45 cable that implements four twisted pair conductors. Therefore, the Ethernet connection 56 is demonstrated in the example of FIG. 2 as including two communication ports, demonstrated as PORT 1 and PORT 2. The PSE device 52 includes a voltage source 58 that is configured to generate a voltage signal $V_{POE}$. In the example of FIG. 2, the PSE device 52 includes a PoE controller 60 that provides a voltage control signal P_CTL to the voltage source 58 to control the amplitude of the voltage signal $V_{POE}$ (e.g., depending on the operating phase), and to measure the class current of the voltage signal $V_{POE}$. The PoE controller 60 is also configured to generate a switching signal SW to control a set of switches $S_1$ and $S_2$ to provide the voltage signal $V_{POE}$ and a low-voltage (e.g., ground) connection, respectively, to the PD 54 via the Ethernet connection 56 as the voltage $V_{PORT}$ in the example of FIG. 1. Therefore, in response to the switching signal SW, the voltage signal $V_{PORT}$ is provided to the PD 54 based on the voltage $V_{POE}$ via each of PORT 1 and PORT 2. Accordingly, the PoE controller 60 can be configured to control an activation time and an amplitude of the voltage signal $V_{PORT}$, such as based on a given operating phase of the PoE control system 50, to provide communication to the PD 54. As one example, the voltage signal $V_{POE}$ can be provided via the voltage source 58 as the variable voltage $V_{PORT}$. As another example, the voltage signal $V_{POE}$ can be constant (e.g., between approximately 44 volts and approximately 57 volts), and the PSE device 52 can be configured to modulate the impedance of the switch $S_1$ to provide the variable voltage $V_{PORT}$ provided to the PD 54.

In the example of FIG. 2, the PD 54 includes a pair of rectifiers 62 that are each coupled to the Ethernet connection 56 at the respective ports PORT 1 and PORT 2. The rectifiers 62 are configured to provide the voltage signal $V_{PORT}$ across a capacitor CPD. In the example of FIG. 2, the PD 54 includes a PoE signal receiver 64 ("PoE RX") that receives a voltage $V_P$ corresponding to the voltage signal $V_{PORT}$ across the capacitor CPD. The PoE signal receiver 64 thus receives the voltage $V_P$ and acts as a current source with respect to the voltage $V_P$, and thus the voltage signal $V_{PORT}$, such that the PoE signal receiver 64 can adjust the class current of the voltage signal $V_{PORT}$ to provide communication to the PSE device 52 in response to the voltage signal $V_{PORT}$. In addition, the PD 54 includes a power controller 66 to which the PoE signal receiver 64 can provide a control signal CTRL. Therefore, in response to a power setting command provided to the PoE signal receiver 64 by the PoE controller 60, the PoE signal receiver 64 can indicate a desired output power level, such as being a function (e.g., percentage) of the nominal power level of the PD 54, to the power controller 66 via the control signal CTRL. Accordingly, during the activation phase described in greater detail herein, the power controller 66 can provide the desired output power dictated by the power setting command in response to the full amplitude of the voltage signal $V_{PORT}$ provided by the PSE device 52.

Figure 3:
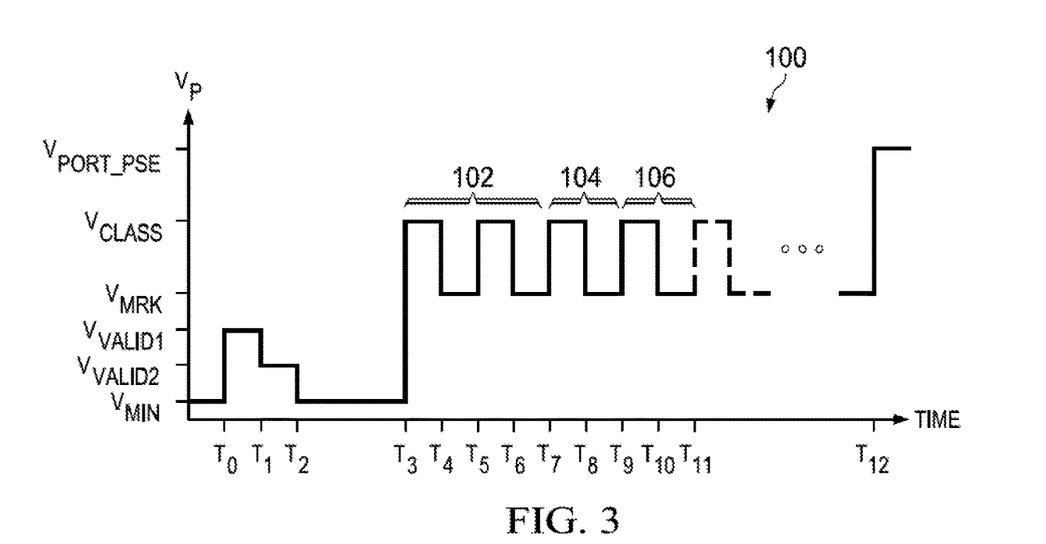
FIG. 3 illustrates an example of a timing diagram.

FIG. 3 illustrates an example of a timing diagram 100. The timing diagram 100 demonstrates an amplitude of the voltage signal $V_P$ as a function of time. The timing diagram 100 can correspond to operation of the PoE control system 50. Therefore, reference is to be made to the example of FIG. 2 in the following description of the example of FIG. 3.

Prior to a time $T_0$, the voltage signal $V_P$ can have an amplitude $V_{MIN}$, corresponding to a substantially minimum voltage (e.g., zero volts). As an example, the amplitude $V_{MIN}$ could correspond to an actual voltage amplitude of the voltage signal $V_P$, or could correspond to the switches $S_1$ and $S_2$ being open. At the time $T_0$, the PSE device 52 can begin operating in a detection phase, such that the voltage signal $V_P$ increases to a low amplitude $V_{VALID1}$ (e.g., between approximately 2.8 volts and approximately 10 volts). Since the PD 54 is electrically coupled to the PSE device 52 via the Ethernet connection 56, the PoE signal receiver 64 can respond by providing a sufficient resistance with respect to the voltage signal $V_P$ to indicate to the PSE device 52 that the PD 54 is coupled via the Ethernet connection 56. At a time $T_1$, the voltage signal $V_P$ decreases to an amplitude $V_{VALID2}$ (e.g., also between approximately 2.8 volts and approximately 10 volts, but different (e.g., less) than the amplitude $V_{VALID1}$). Therefore, the PSE device 52 can determine the resistance value of the PoE signal receiver 64 based on a $\Delta I/\Delta V$ of the separate amplitudes $V_{VALID1}$ and $V_{VALID2}$. At a time $T_2$, the amplitude $V_{MIN}$, thus concluding the detection phase. While the detection phase is demonstrated in the example of FIG. 3 as including only a single differential measurement of the voltage signal $V_P$ at the amplitudes $V_{VALID1}$ and $V_{VALID2}$, it is to be understood that the detection phase could include differential measurements and/or additional amplitudes in the detection phase voltage amplitude range, such as dictated by the IEEE 802.3at standard.

At the time $T_3$, the PSE device 52 switches to a classification phase, during which the PoE controller 60 can determine whether the PD 54 has a capacity for PoE control, can determine a nominal power level of the PD 54, and can provide a power setting command to the PoE signal receiver 64. Beginning at the time $T_3$, the PSE device 52 provides a first event classification, demonstrated at 102 as a 2-Event classification. At the time $T_3$, the voltage signal $V_P$ is provided at an amplitude $V_{CLASS}$ in a first class event. The amplitude $V_{CLASS}$ can correspond to a voltage amplitude in a classification amplitude range amplitude (e.g., between approximately 15.5 volts and approximately 20.5 volts). In response to receiving the voltage signal $V_P$ of the first class event at the time $T_3$ (e.g., via the voltage $V_P$), the PoE signal receiver 64 can indicate a first class value (e.g., Class 4). At a time $T_4$, the voltage signal $V_P$ can decrease to an amplitude $V_{MRK}$, corresponding to a mark event. As an example, the mark event can signify to the PoE signal receiver 64 the end of the first class event. Similarly, at a time $T_5$, the PSE device 52 provides the voltage signal $V_P$ at the amplitude $V_{CLASS}$ in a second class event of the first event classification (e.g., of the 2 Event classification), in response to which the PoE signal receiver 64 can provide a second class value (e.g., Class 4), followed by another mark event at a time $T_6$. As an example, the first and second class values can be equal (e.g., Class 4). Thus, the PD 14 can respond to the first event classification with a class signature that comprises two Class 4 current responses to the respective two class events of the first event classification 102. The example of FIG. 3 demonstrates that the first event classification 102 comprises two class events in a 2-Event classification scheme, such as to ensure a linear response to a substantially constant amplitude of the voltage signal $V_P$ at the classification amplitude range. However, it is to be understood that the PoE controller 60 can be configured to provide the first event classification as a 1-Event classification by providing a single class event, or based on providing more than two class events.

At a time $T_7$, the PSE device 52 again provides the voltage signal $V_P$ at an amplitude $V_{CLASS}$ in a second event classification (e.g., a 1-Event classification), demonstrated at 104. In response to receiving the voltage signal $V_P$ in a class event of the second event classification 104 (e.g., via the voltage $V_P$), the PoE signal receiver 64 can provide a second class signature (e.g., Class 5). At a time $T_5$, the voltage signal $V_P$ can decrease to the amplitude $V_{MRK}$, corresponding to a mark event of the second event classification 104, thus signifying to the PoE signal receiver 64 the end of the class event of the second event classification 104. The second class signature can be provided by the PoE signal receiver 64 at a value that is different from (e.g., greater than) the first class signature, thus potentially signifying to the PoE controller 60 that the PD 54 may have a capacity for PoE control.

At a time $T_9$, the PSE device 52 again provides the voltage signal $V_P$ at an amplitude $V_{CLASS}$ in a third event classification, demonstrated at 106. In response to receiving the voltage signal $V_P$ in the third event classification 106 (e.g., via the voltage $V_P$), the PoE signal receiver 64 can provide a third class signature at a value that is less than the second class signature (e.g., Class 0-4). At a time $T_{10}$, the voltage signal $V_P$ can decrease to the amplitude $V_{MRK}$, corresponding to a mark event, thus signifying to the PoE signal receiver 64 the end of the third event classification 106. The third class signature can be provided by the PoE signal receiver 64 at a value that is less than the second class signature to indicate to the PoE controller 60 that the PD 54 has a capacity for PoE control. In addition, the specific class value of the third class signature 106 can indicate to the PoE controller 60 the nominal power level of the PD 54. For example, the class value of the third class signature can correspond to one of a plurality of predetermined nominal power levels, such that the PoE controller 60 can identify the nominal power level based on the value of the third class signature, such as provided in Table 1 below:

TABLE 1

| Third Class Signature Value | Nominal Power Level of the PD 54 |
|---|---|
| 0 | 15 W |
| 1 | 30 W |
| 2 | 45 W |
| 3 | 60 W |
| 4 | 90 W |

The predetermined nominal power levels demonstrated in the example of Table 1 are provided only by example, in that any of a variety of other predetermined nominal power levels can be provided in the communication from the PoE signal receiver 64 to the PoE controller 60 via the third class signature.

As described previously, in response to identifying the nominal power level of the PD 54, the PoE controller 60 can be configured to control the power level of the PD 54 as a function of the nominal power level, such that the power output of the PD 54 can be variably controlled by the PoE controller 60. At a time $T_{11}$, the PoE controller 60 can begin to provide a number of event classifications (e.g., 1-Event classifications) via the voltage signal $V_P$ associated with a code corresponding to the power setting command. As an example, the power setting command can be encoded based on a quantity of class events corresponding to a predetermined percentage of the nominal power level, such as provided in Table 2 below:

| Quantity of Class Events | Percentage of Nominal Power Level |
|---|---|
| 0 | 100% |
| 1 | 80% |
| 2 | 55% |
| 3 | 30% |

The predetermined percentage values of the nominal power level demonstrated in the example of Table 2 are provided only by example, in that the PoE controller 60 can be configured to provide any of a variety of predetermined quantities corresponding to associated percentages of nominal power level. The example of FIG. 3 demonstrates a single class event with associated mark event subsequently at the time $T_{11}$. However, it is to be understood that the PoE controller 60 can be configured to provide zero class events to signify a desired power level of the PD 54.

In response to the code, the PoE signal receiver 64 can identify the percentage of the nominal power level that is desired to be output from the PD 54 by the PoE controller 60. As a result, at a time $T_{12}$, the PSE device 52 begins operating in the activation phase, and thus provides the voltage signal $V_P$ at a maximum amplitude $V_{PORT}$ PSE (e.g., between approximately 44 volts and approximately 57 volts, as dictated by a maximum voltage of an associated power supply). Therefore, the PD 54 can operate at the percentage of the nominal power level based on the power command setting. Accordingly, the PoE control system 50 described herein can operate to provide PHY layer power control of the PD 54 in a simplistic and variable manner.

Figure 4:
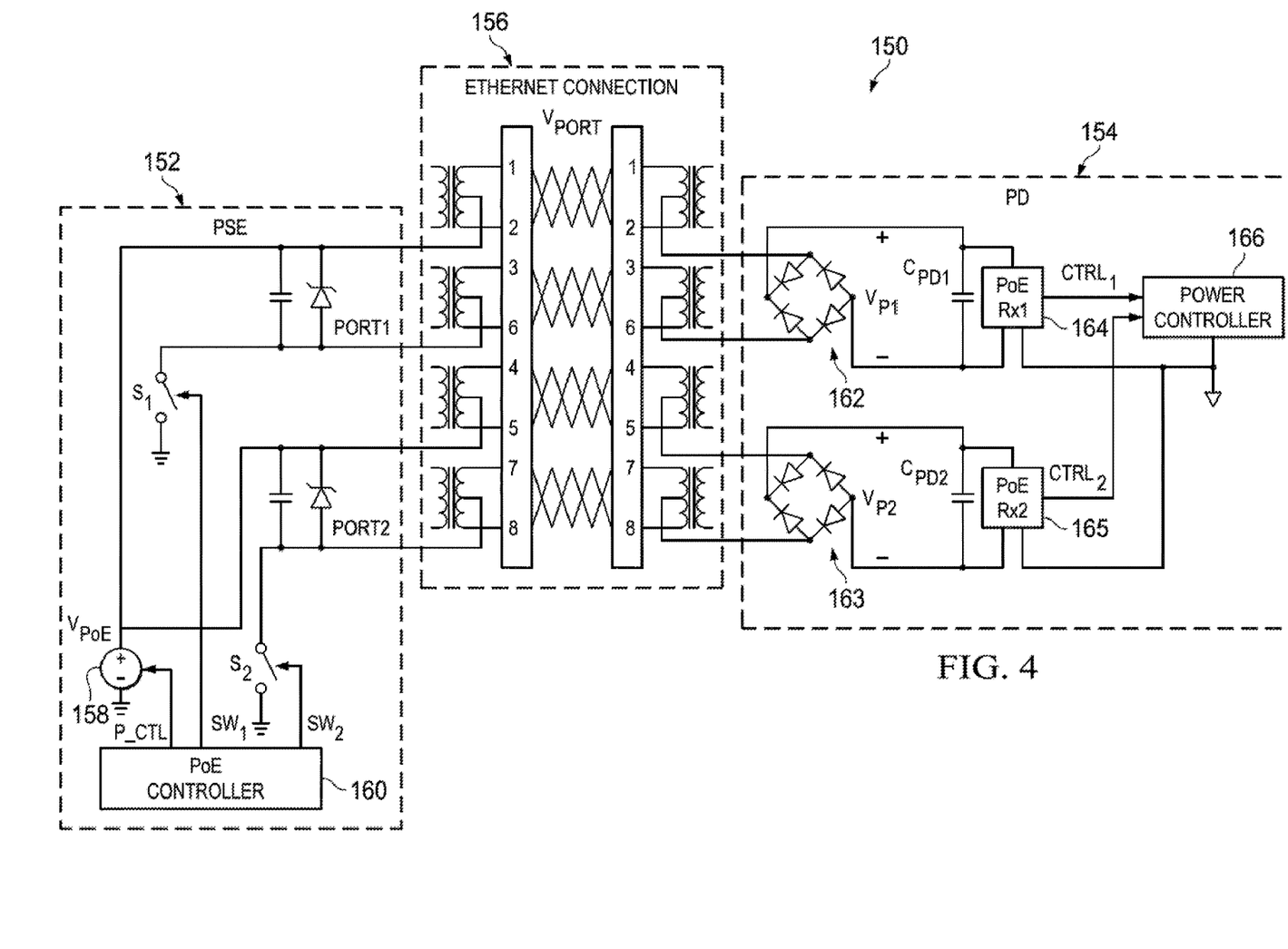
FIG. 4 illustrates yet another example of a PoE control system.

FIG. 4 illustrates yet another example of a PoE control system 150. The PoE control system 150 can correspond to the PoE control system 10 in the example of FIG. 1, such as in a PoE lighting application. For example, the PoE control system 150 can be implemented to provide power control via existing Ethernet cables (e.g., RJ-45 cables) without Ethernet data communication capability (e.g., utilizing data/link layers, packetization, etc.).

The PoE control system 150 includes a PSE device 152 and a PD 154 that are electrically coupled via an Ethernet connection 156. In the example of FIG. 4, the Ethernet connection 156 is demonstrated as an RJ-45 cable that implements four twisted pair conductors. Therefore, the Ethernet connection 156 is demonstrated in the example of FIG. 4 as including two communication ports, demonstrated as PORT 1 and PORT 2. The PSE device 152 includes a voltage source 158 that is configured to generate a variable voltage signal $V_{POE}$. Similar to as described previously in the example of FIG. 3, the PSE device 152 can provide the voltage $V_{POE}$ in a variable manner as the voltage $V_{PORT}$ across the Ethernet connection 156.

In the example of FIG. 4, the PSE device 152 includes a PoE controller 160 that provides a voltage control signal P_CTL to the voltage source 158 to control the amplitude of the voltage signal $V_{POE}$ (e.g., depending on the operating phase), and to measure the class current of the voltage signal $V_{PORT}$. The PoE controller 160 is also configured to generate a pair of switching signals $SW_1$ and $SW_2$ to control a respective set of switches $S_1$ and $S_2$ to provide the voltage signal $V_{POE}$ and a low-voltage (e.g., ground) connection, respectively, to the PD 154 via the Ethernet connection 156. Therefore, in response to the switching signal $SW_1$, the voltage signal $V_{PORT}$ is provided to the PD 154 via PORT 1, and in response to the switching signal $SW_2$, the voltage signal $V_{PORT}$ is provided to the PD 154 via PORT 2. Accordingly, the PoE controller 160 can be configured to control an activation time and an amplitude of the voltage signal $V_{PORT}$ on each of PORTS 1 and 2 individually, such as based on a given operating phase of the PoE control system 150, to provide communication to the PD 154.

In the example of FIG. 4, the PD 154 includes a first rectifier 162 that is coupled to the Ethernet connection 156 at PORT 1 and a second rectifier 163 that is coupled to the Ethernet connection 156 at PORT 2. The first rectifier 162 is configured to provide the voltage signal $V_{PORT}$ across a first capacitor $C_{PD1}$ and the second rectifier 163 is configured to provide the voltage signal $V_{PORT}$ across a second capacitor $C_{PD2}$. In the example of FIG. 4, the PD 154 includes a first PoE signal receiver 164 ("PoE RX1") that receives a voltage $V_{P1}$ corresponding to the voltage signal $V_{PORT}$ across the first capacitor $C_{PD1}$ and a second PoE signal receiver 165 ("PoE RX2") that receives a voltage $V_{P2}$ corresponding to the voltage signal $V_{PORT}$ across the second capacitor $C_{PD2}$.

The first PoE signal receiver 164 thus receives the voltage VPD1 and acts as a current source with respect to the voltage VPD1, and thus the voltage signal $V_{PORT}$, such that the first PoE signal receiver 164 can adjust the class current of the voltage signal $V_{PORT}$ to provide communication to the PSE device 152 in response to the voltage signal $V_{PORT}$. Similarly, the second PoE signal receiver 165 thus receives the voltage VPD2 and acts as a current source with respect to the voltage VPD2, and thus the voltage signal $V_{PORT}$, such that the second PoE signal receiver 164 can adjust the class current of the voltage signal $V_{PORT}$ to provide communication to the PSE device 152 in response to the voltage signal $V_{PORT}$. In addition, the PD 154 includes a power controller 166 to which the first and second PoE signal receivers 164 and 165 can provide respective control signals CTRL1 and CTRL2. Therefore, in response to a power setting command provided to at least one of the PoE signal receivers 164 and 165 by the PoE controller 160, the PoE signal receiver(s) 164 and 165 can indicate a desired output power level, such as being a function (e.g., percentage) of the nominal power level of the PD 154, to the power controller 166 via the control signal(s) CTRL1 and CTRL2. Accordingly, during the activation phase described in greater detail herein, the power controller 166 can provide the desired output power dictated by the power setting command in response to the full amplitude of the voltage signal $V_{PORT}$ provided by the PSE device 152.

Figure 5:
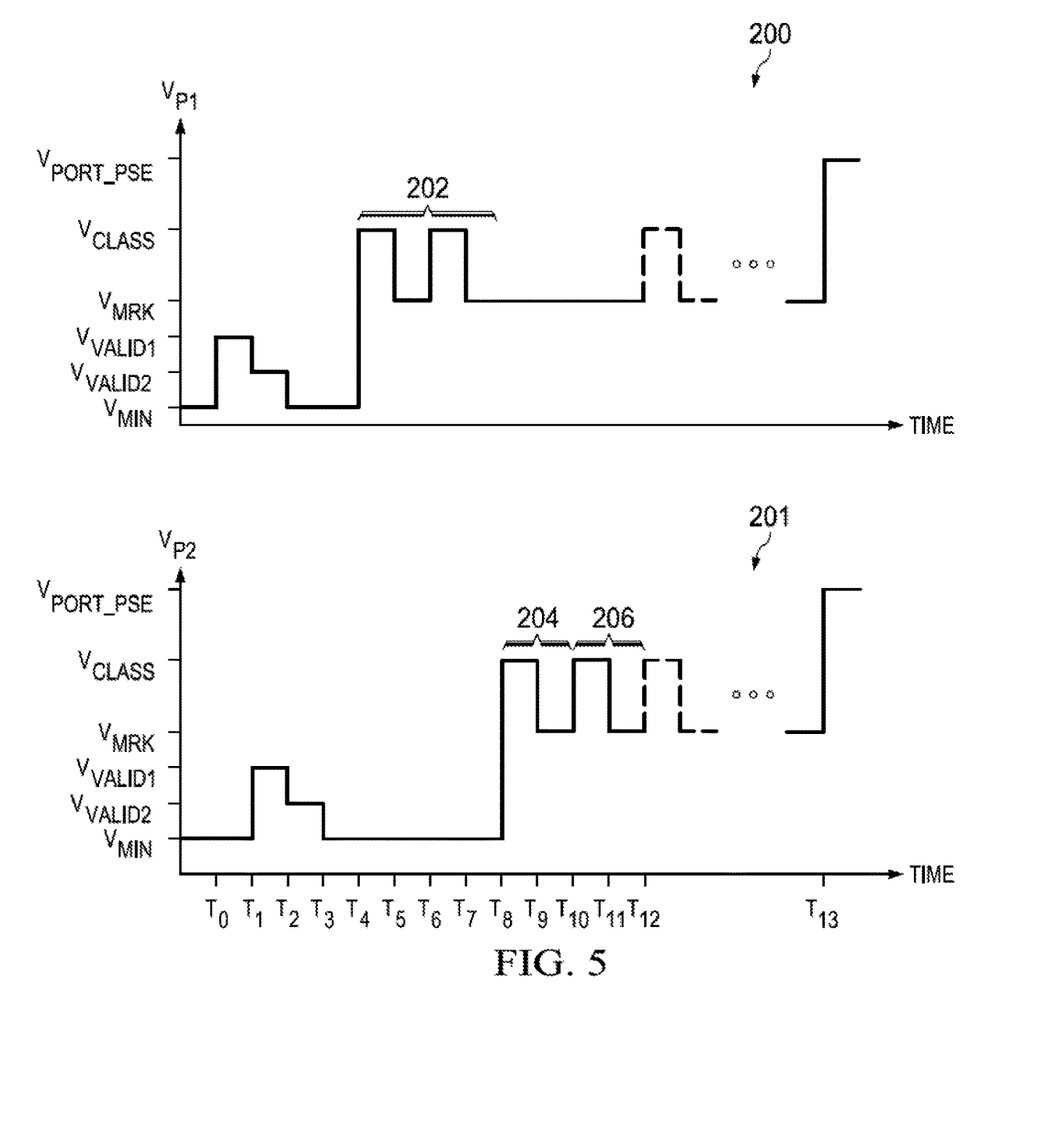
FIG. 5 illustrates another example of a timing diagram.

FIG. 5 illustrates an example of timing diagrams 200 and 201. The timing diagram 200 demonstrates an amplitude of the voltage $V_{P1}$ as a function of time, and the timing diagram 201 demonstrates an amplitude of the voltage $V_{P2}$ as a function of time. The timing diagrams 200 and 201 can correspond to operation of the PoE control system 150. Therefore, reference is to be made to the example of FIG. 4 in the following description of the example of FIG. 5. Thus, the voltage $V_{P1}$ corresponds to the voltage $V_{PORT}$ in response to activation of the switch $S_1$ via the switching signal $SW_1$, and voltage $V_{P2}$ corresponds to the voltage $V_{PORT}$ in response to activation of the switch $S_2$ via the switching signal $SW_2$.

Prior to a time $T_0$, the voltages $V_{P1}$ and $V_{P2}$ can each have an amplitude $V_{MIN}$, corresponding to a substantially minimum voltage (e.g., zero volts). As an example, the amplitude $V_{MIN}$ could correspond to an actual voltage amplitude of the voltages $V_{P1}$ and $V_{P2}$, or could correspond to the switches $S_1$ and $S_2$ being open. At the time $T_0$, the PSE device 152 can begin operating in a detection phase, such that the voltage $V_{P1}$ increases to the amplitude $V_{VALID1}$. Since the PD 154 is electrically coupled to the PSE device 152 via the Ethernet connection 156, the first PoE signal receiver 164 can respond by providing a sufficient resistance with respect to the voltage $V_{P1}$ to indicate to the PSE device 152 that the PD 154 is coupled via the Ethernet connection 156. At a time $T_1$, the voltage $V_{P1}$ decreases to an amplitude $V_{VALID1}$, while the voltage $V_{P2}$ increases to the amplitude $V_{VALID1}$. At a time $T_2$, the voltage $V_{P1}$ decreases back to the amplitude $V_{MIN}$. Similarly, at a time $T_2$, the voltage $V_{P2}$ decreases to the amplitude $V_{VALID2}$. Since the PD 154 is electrically coupled to the PSE device 152 via the Ethernet connection 156, the second PoE signal receiver 165 can respond by providing a sufficient resistance with respect to the voltage $V_{P2}$ to indicate to the PSE device 152 that the PD 154 is coupled via the Ethernet connection 156. Therefore, the PSE device 152 can determine the resistance value of the PoE signal receivers 164 and 165 based on a $\Delta I/\Delta V$ of the separate amplitudes $V_{VALID1}$ and $V_{VALID2}$. At a time $T_3$, the voltage $V_{P2}$ decreases back to the amplitude $V_{MIN}$, thus concluding the detection phase, based on which the PoE controller 160 identifies that both PORT 1 and PORT 2 are coupled to the respective first and second PoE signal receivers 164 and 165. While the detection phase is demonstrated in the example of FIG. 5 as including only a single pulse of the voltages $V_{P1}$ and $V_{P2}$ at the single amplitude $V_{VALID}$, it is to be understood that the detection phase could include additional pulses and/or additional amplitudes in the detection phase voltage amplitude range, such as dictated by the IEEE 802.3at standard, for each of the voltages $V_{P1}$ and $V_{P2}$.

At the time $T_4$, the PSE device 152 switches to a classification phase, during which the PoE controller 160 can determine whether the PD 154 has a capacity for PoE control, can determine a nominal power level of the PD 154, and can provide a power setting command to the PoE signal receiver(s) 164 and 165. Beginning at the time $T_4$, the PSE device 152 provides a first event classification to the first PoE signal receiver 164, demonstrated at 102 as a 2-Event classification. Thus, at the time $T_4$, the voltage $V_{P1}$ increases to an amplitude $V_{CLASS}$ in a first class event. The amplitude $V_{CLASS}$ can correspond to a voltage amplitude in a classification amplitude range amplitude (e.g., between approximately 15.5 volts and approximately 20.5 volts). In response to the increase of the voltage $V_{P1}$ of the first class event in the first event classification 202, the PoE signal receiver 164 can provide a first class value (e.g., Class 4). At a time $T_5$, the voltage $V_{P1}$ can decrease to an amplitude $V_{MRK}$, corresponding to a mark event. As an example, the mark event can signify to the first PoE signal receiver 164 the end of the first class event of the event classification 202. Similarly, at a time $T_6$, the voltage $V_{P1}$ increases to the amplitude $V_{CLASS}$ in a second class event of the event classification 202, in response to which the PoE signal receiver 64 can provide a second class value (e.g., Class 4), followed by another mark event at a time $T_7$. As an example, the first and second initial class values can be equal (e.g., Class 4). Thus, the first PoE receiver 164 can respond to the first event classification with a class signature that comprises two Class 4 current responses to the respective two class events of the first event classification 202. The example of FIG. 5 demonstrates that the first event classification 202 comprises two class events in a 2-Event classification scheme, such as to ensure a linear response to a substantially constant amplitude of the voltage signal $V_{PORT}$ at the classification amplitude range. However, it is to be understood that the PSE device 152 can be configured to provide the first event classification as a 1-Event classification by providing a single class event, or based on providing more than two class events.

At a time $T_5$, the PSE device 152 provides a second event classification via PORT 2, demonstrated at 204, at which the voltage $V_{P2}$ increases to an amplitude $V_{CLASS}$ in a class event at the time $T_5$. In response to the class event of the second event classification 204, the second PoE signal receiver 165 can provide a second class signature (e.g., Class 5). At a time $T_9$, the voltage $V_{P2}$ can decrease to the amplitude $V_{MRK}$, corresponding to a mark event, thus signifying to the second PoE signal receiver 165 the end of the class event of the event classification 204. The second class signature can be provided by the second PoE signal receiver 165 at a value that is different from the first class signature, thus potentially signifying to the PoE controller 160 that the PD 154 may have a capacity for PoE control.

At a time $T_{10}$, the PSE device 152 provides a third event classification via PORT 2, demonstrated at 206, at which the voltage $V_{P2}$ increases to the amplitude $V_{CLASS}$ in a class event at the time $T_{10}$. In response to the class event of the third event classification 206, the second PoE signal receiver 166 can provide a third class signature that is less than the second class signature (e.g., Class 0-4). At a time $T_{11}$, the voltage $V_{P2}$ can decrease to the amplitude $V_{MRK}$, corresponding to a mark event, thus signifying to the second PoE signal receiver 165 the end of the class event of the third event classification 206. The third class signature can be provided by the second PoE signal receiver 166 at a value that is less than the second class signature to indicate to the PoE controller 160 that the PD 154 has a capacity for PoE control. In addition, the specific class value of the third class signature 206 can indicate to the PoE controller 160 the nominal power level of the PD 154, such as demonstrated previously in Table 1.

As described previously, in response to identifying the nominal power level of the PD 154, the PoE controller 160 can be configured to control the power level of the PD 154 as a function of the nominal power level, such that the power output of the PD 154 can be variably controlled by the PoE controller 160. At a time $T_{11}$, the PoE controller 160 can begin to provide a number of class events via one or both of the voltages $V_{P1}$ and $V_{P2}$ associated with a code corresponding to the power setting command. As an example, the power setting command can be encoded based on a quantity of pulses of the class events corresponding to a predetermined percentage of the nominal power level, such as provided previously in Table 2. As an example, the additional class events that indicate the percentage of nominal power level can be provided solely via the voltage $V_{P1}$, solely via the voltage $V_{P2}$, or based on a combination of the voltages $V_{P1}$ and $V_{P2}$. For example, the code can be based on a sum of the quantity of class events provided via the voltages $V_{P1}$ and $V_{P2}$, or the code can be based on a binary and/or time-based encoding of the class events provided via the voltages $V_{P1}$ and $V_{P2}$. Thus, the additional class events that indicate the percentage of nominal power level can be provided in any of a variety of ways.

In response to the code, the first and/or second PoE signal receivers 164 and 165 can identify the percentage of the nominal power level that is desired to be output from the PD 154 by the PoE controller 160. As a result, at a time $T_{13}$, the PSE device 152 begins operating in the activation phase, and thus provides the voltage signal $V_{PORT}$ at a maximum amplitude to provide the voltages $V_{P1}$ and/or $V_{P2}$ at the amplitude $V_{PORT}$ PSE. Therefore, the PD 154 can operate at the percentage of the nominal power level based on the power command setting. Accordingly, the PoE control system 150 described herein can operate to provide PHY layer power control of the PD 154 in a simplistic and variable manner over multiple ports via the Ethernet connection 156.

Figure 6:
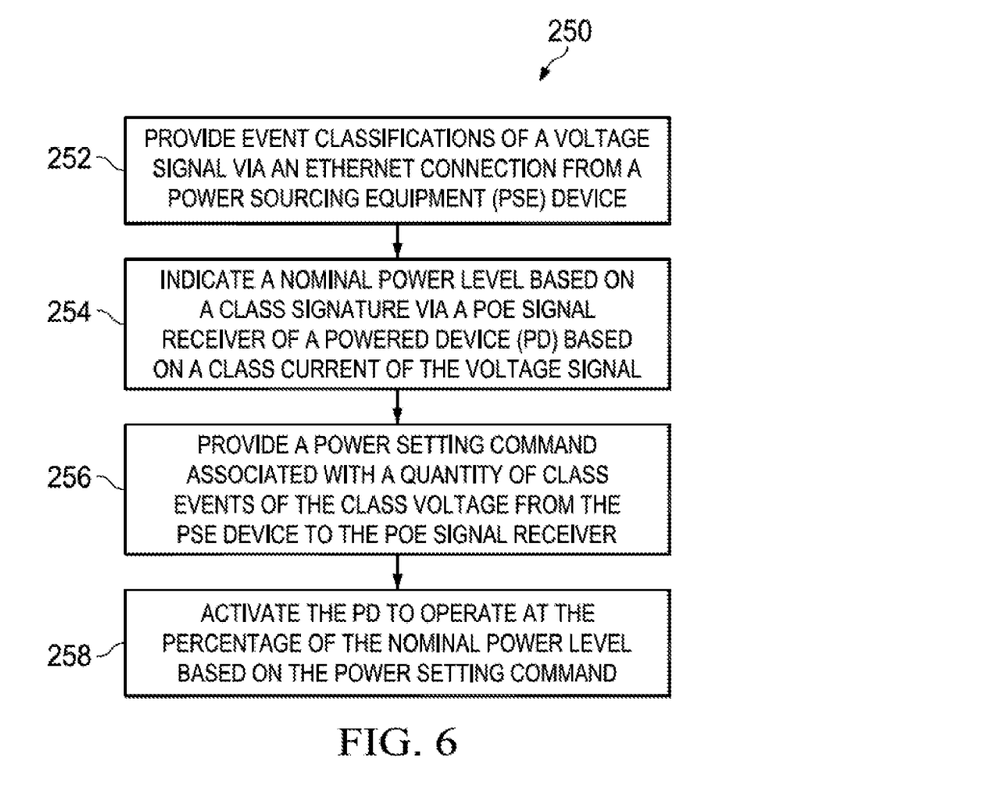
FIG. 6 illustrates an example of a method for providing power control in a PoE control system.

In view of the foregoing structural and functional features described above, a method in accordance with various aspects of the present invention will be better appreciated with reference to FIG. 6. While, for purposes of simplicity of explanation, the method of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention.

FIG. 6 illustrates an example of a method 250 for providing power control in a PoE control system. At 252, event classifications (e.g., event classifications 102, 104, and 106) of a voltage signal (e.g., the voltage signal $V_{PORT}$) are provided via an Ethernet connection (e.g., the Ethernet connection 16) from a PSE device (e.g., the PSE device 12). At 254, a nominal power level is indicated based on a class signature (e.g., the class signature 106) via a PoE signal receiver (e.g., the PoE signal receiver 20) of a powered device (e.g., the PD 14) based on a class current of the voltage signal. At 256, a power setting command associated with a quantity of class events of the voltage signal (e.g., at the time $T_{11}$ in the example of FIG. 3) is provided from the PSE device to the PoE signal receiver. The power setting command can correspond to a percentage of the nominal power level (e.g., Table 1). At 258, the PD is activated to operate at the percentage of the nominal power level based on the power setting command.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A method comprising:
generating and sending a first pulse of a voltage signal during a classification phase;
generating and sending a quantity of pulses of the voltage signal subsequent to the first pulse during the classification phase, the quantity of pulses including a command to operate a powered device (PD) at less than a nominal power level during an operational phase subsequent to the classification phase;
receiving magnitudes of a current responsive to the first pulse, wherein the magnitudes indicate a first, a second, and a third class signature value, in which:
the first class signature value is responsive to a first event classification indicated by a second pulse of the voltage signal received during the classification phase prior to the first pulse;
the second class signature value is responsive to a second event classification indicated by a third pulse of the voltage signal received during the classification phase between the first and second pulses and is different than the first class signature value to indicate that the PD is capable of detecting, from a quantity of pulses, the command to operate at less than the nominal power level; and
the third class signature value is responsive to a third event classification indicated by the first pulse of the voltage signal and is different than the second class signature value;
determining a nominal power of the PD from the current.

2. The method of claim 1, wherein the quantity of pulses of the voltage signal indicates a quantity of class events to command the PD to operate at a percentage of the nominal power level.

3. The method of claim 1, wherein a magnitude of the current indicates a class signature value that communicates the nominal power level.

4. The method of claim 3, wherein the class signature value communicates one of a plurality of predetermined nominal power levels.

5. A method comprising:
controlling generation of pulses of a voltage signal to communicate event classifications during a classification phase, wherein the event classifications include a first event classification, a second event classification that is subsequent to the first event classification, and a third event classification that is prior to the first event classification, in which the first event classification is a 1-event classification and the third event classification is a 2-event classification;
controlling generation of a quantity of pulses of the voltage signal, during the classification phase and subsequent to communicating the event classifications, to communicate a power setting command that indicates a power level for a powered device (PD) that is a function of a nominal power level;
monitoring current responsive to the event classifications to determine class signatures, wherein the class signatures include:
a first class signature responsive to the first event classification, the first class signature indicating a capability of the PD to detect the power setting command from the quantity of pulses;
a second class signature responsive to the second event classification, the second class signature indicating the nominal power level; and
a third class signature responsive to the third class event; and
determining the nominal power level of the PD from the class signatures.

6. The method of claim 5, further comprising:
identifying a first class value from the first class signature;
identifying a second class value from the second class signature, wherein the second class value is different than the first class value; and
identifying a third class value from the third class signature, wherein the third class value is different than the first class value.

7. The method of claim 6, wherein:
the first class value is Class 5; and
the third class value is Class 4.

8. The method of claim 5, further comprising generating a switching signal to control a pair of switches to generate the voltage signal.

9. The method of claim 8, further comprising controlling, via the switching signal, an activation time during which the pair of switches are closed to communicate the event classifications and generate the quantity of pulses of the voltage signal subsequent to the event classifications.

10. A method comprising:
generating a voltage signal varying in amplitude responsive to a phase of power-over-Ethernet (PoE) control, wherein the amplitude communicates event classifications that include a first event classification, a second event classification that is subsequent to the first event classification, and a third event classification that is prior to the first event classification, in which the first event classification is a 1-event classification and the third event classification is a 2-event classification;
monitoring a current responsive to the voltage signal to determine class signatures during a classification phase, wherein the class signatures include a first class signature responsive to the first event classification, and a second class signature responsive to the second event classification, in which
  the first class signature indicates a capability of a powered device (PD) to detect the power setting command from a quantity of pulses of the voltage signal;
  the second class signature indicates a nominal power level; and
  a third class signature responsive to the third event classification;
determining the nominal power level of the PD from the class signatures; and
providing a power setting command during the classification phase to instruct the PD to operate during an operational phase at a power level that is a function of the nominal power level, wherein the power setting command is encoded in the quantity of pulses of the voltage signal.

11. The method of claim 10, further comprising:
identifying a first class value from the first class signature;
identifying a second class value from the second class signature, wherein the second class value is different than the first class value; and
identifying a third class value from the third class signature, wherein the third class value is different than the first class value.

12. The method of claim 11, wherein:
the first class value is Class 5; and
the third class value is Class 4.

* * * * *